United States Patent
Chaudhry et al.

(10) Patent No.: US 9,794,239 B1
(45) Date of Patent: Oct. 17, 2017

(54) METHOD AND SYSTEM FOR AUTHENTICATING SERVICE PROVIDERS TO COMMUNICATE WITH A PRIMARY SERVICE PROVIDER

(75) Inventors: Kapil Chaudhry, Cerritos, CA (US); David N. Schlacht, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 445 days.

(21) Appl. No.: 13/031,094

(22) Filed: Feb. 18, 2011

(51) Int. Cl.
*H04L 29/06* (2006.01)
*G06F 21/10* (2013.01)
*G06F 21/31* (2013.01)
*H04L 9/32* (2006.01)

(52) U.S. Cl.
CPC .............. *H04L 63/08* (2013.01); *G06F 21/10* (2013.01); *G06F 21/31* (2013.01); *H04L 9/32* (2013.01); *H04L 63/0807* (2013.01); *H04L 63/0815* (2013.01); *H04L 63/0876* (2013.01)

(58) Field of Classification Search
CPC . H04L 63/08; H04L 63/0807; H04L 63/0876; H04L 9/32; H04L 63/0815; G06F 21/10; G06F 21/31
USPC .......... 726/2, 8, 9, 10, 26–30; 713/151, 172, 713/182, 193; 380/278, 282
See application file for complete search history.

(56) References Cited

U.S. PATENT DOCUMENTS

| | | | |
|---|---|---|---|
| 7,043,230 B1 | 5/2006 | Geddes | |
| 7,478,434 B1* | 1/2009 | Hinton et al. | 726/27 |
| 7,565,554 B2* | 7/2009 | Joosten et al. | 713/193 |
| 8,176,163 B1* | 5/2012 | Fikes et al. | 709/223 |
| 8,364,970 B2* | 1/2013 | Fu | 713/185 |
| 8,819,848 B2* | 8/2014 | Moore | 726/28 |
| 2004/0054750 A1* | 3/2004 | de Jong et al. | 709/217 |
| 2004/0117430 A1* | 6/2004 | Bazot et al. | 709/200 |

(Continued)

OTHER PUBLICATIONS

S. O. Hwang, "Content and Service Protection for IPTV," in IEEE Transactions on Broadcasting, vol. 55, No. 2, pp. 425-436, Jun. 2009.*

(Continued)

*Primary Examiner* — Kari Schmidt
(74) *Attorney, Agent, or Firm* — Harness, Dickey & Pierce, PLC (57) ABSTRACT

A method and system for authenticating a user device includes an identity provider reading service and an external service provider receiving a request to access content from a user device and communicating the request to access content from a service provider to the reading service. The request to access content includes cookie data. The external service requests an identity provider token from the cookie data from the reading service based on the request to access. The identity provider reading service communicates the identity provider token to the external service provider. An identity provider communicates with the service provider. The external service generates and communicates an authentication request to the identity provider having the identity provider token and a service provider identifier. The identity provider communicates an assertion signal to the service provider when the cookie data is resolved at the identity provider. The service provider grants access to content to the user device in response to the assertion signal.

25 Claims, 6 Drawing Sheets

(56) References Cited

U.S. PATENT DOCUMENTS

| | | | |
|---|---|---|---|
| 2005/0044377 A1* | 2/2005 | Huang | 713/182 |
| 2005/0066353 A1* | 3/2005 | Fransdonk | 725/29 |
| 2005/0086683 A1 | 4/2005 | Meyerson | |
| 2005/0262026 A1* | 11/2005 | Watkins | 705/67 |
| 2006/0272031 A1* | 11/2006 | Ache et al. | 726/28 |
| 2007/0118889 A1* | 5/2007 | Fredell | 726/5 |
| 2007/0203714 A1 | 8/2007 | McEnroe et al. | |
| 2007/0240195 A1 | 10/2007 | Doran | |
| 2008/0134312 A1* | 6/2008 | Ache et al. | 726/9 |
| 2009/0158316 A1 | 6/2009 | Kokernak et al. | |
| 2012/0008786 A1* | 1/2012 | Cronk et al. | 380/282 |
| 2012/0151077 A1* | 6/2012 | Finster | 709/231 |
| 2012/0210340 A1 | 8/2012 | Reynolds et al. | |

OTHER PUBLICATIONS

Chalouf, Mohamed Aymen, et al. "On tightly managing end-to-end QOS and security for IPTV service delivery." Proceedings of the 2009 International Conference on Wireless Communications and Mobile Computing: Connecting the World Wirelessly. ACM, pp. 1030-1034. 2009.* hackingnetflix.com; "What Happens When You Hit Netflix's 6 Streaming Device Limit?"; Mar. 12, 2010; one page.

Hughes et al.; Profiles for the OASIS Security Assertion Markup Language (SAML) V2.0; Mar. 15, 2005; http://docs.oasis-open.org/security/saml/v2.o/; pp. 31-32.

Final Rejection dated Dec. 10, 2014 in U.S. Appl. No. 13/031,105 filed Feb. 18, 2011 by Kapil Chaudhry et al.

* cited by examiner

METHOD AND SYSTEM FOR AUTHENTICATING SERVICE PROVIDERS TO COMMUNICATE WITH A PRIMARY SERVICE PROVIDER

TECHNICAL FIELD

The present disclosure relates generally to communication systems for communicating data to a user device, and more particularly, to a method and system for authenticating external service providers to communicate with primary service providers.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Conditional access is provided at the user device in the form of a card that allows the user device to receive and process signals from the primary service provider.

Providing secure access to data is important for a primary service provider. At certain time such as an Olympic event, networks may share coverage with other networks or service providers. Providing access to the content to customers of another service provider is desirable. Accessibility for the content is also important. An example of a type of data that may be provided includes program guide data and other types of data such as metadata associated with the guide data. Security is important for the content and to prevent unauthorized access of the content.

SUMMARY

The present disclosure provides a system and method for authenticating a user device in a system that includes a primary service provider and an external service provider.

In one aspect of the invention, a method includes receiving a request to access content from a user device at an external service provider and communicating the request to access content from the external service provider to a reading service. The request to access content includes cookie data. The method also includes requesting an identity provider token from the cookie data from the reading service based on the request to access, communicating the identity provider token to the external service provider, generating an authentication request to an identity provider having the identity provider token and an external service provider identifier and communicating the authentication request from the external service provider to the identity provider. When the cookie data is resolved at the identity provider, the method includes communicating an assertion signal to the external service provider and granting access to content to the user device in response to the assertion signal.

In another aspect of the invention, a system includes an identity provider reading service and an external service provider receiving a request to access content from a user device and communicating the request to access content from a service provider to the reading service. The request to access content includes cookie data. The external service requests an identity provider token from the cookie data from the reading service based on the request to access. The identity provider reading service communicates the identity provider token to the external service provider. An identity provider communicates with the service provider. The external service generates and communicates an authentication request to the identity provider having the identity provider token and a service provider identifier. The identity provider communicates an assertion signal to the service provider when the cookie data is resolved at the identity provider. The service provider grants access to content to the user device in response to the assertion signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The word, service, is used to convey hardware, software or a combination thereof. The service may be implemented in a computer file server or web server. Servers may be standalone or combined to have various functions. The servers may be physically located in one location or multiple locations. More than one server device may perform a particular function. When more than one server is used, they may be distributed geographically. Servers have an associated memory in which data is stored. Servers provide different functions to prevent overloading and maintain service speed. The servers may have "containers" therein that provide the unique environment. The containers may be used interchangeably with web server herein. The containers execute the process in the web server.

The following system is designed to ingest schedule data from an external service provider. The schedule data may include various data associated or relevant to the content that is or will be provided from the external service provider. Examples include but are not limited to identifiers which are numeric or alphanumeric identifiers for the content, network, channel and third-party identifier. Other data may include but are not limited to the title, a description, start time, end time, publish date, end publish date, category, maturity rating, actor and series.

Figure 1:
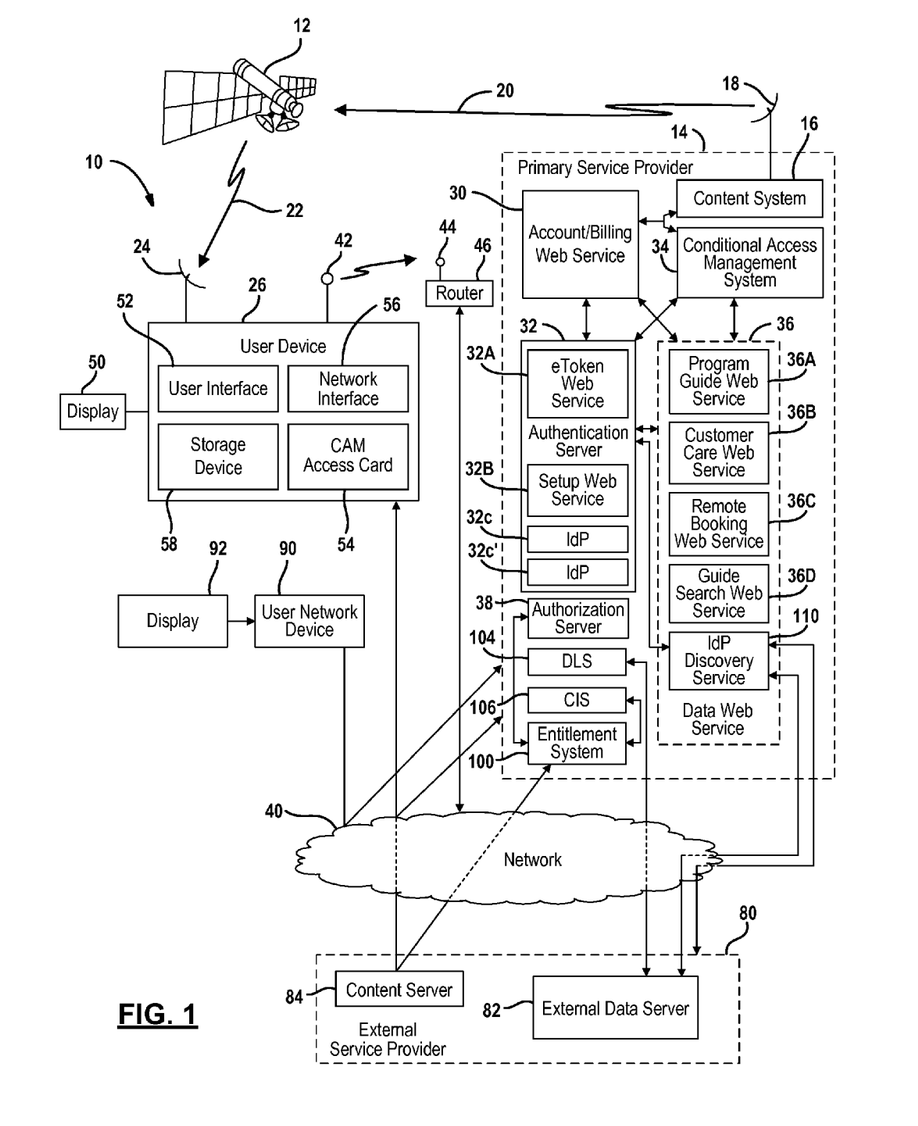
FIG. 1 is a block diagrammatic view of a first embodiment of a satellite communication system according to the present disclosure.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The content system 16 may have content stored therein or pass content therethrough as in live television broadcasting. Thus, the content system 16 may provide both stored content and live content to user devices. The content may be communicated through a terrestrial or extraterrestrial source. The primary service provider 14 may provide the final link to a user device 26 that is associated with the primary service provider (e.g. a subscriber).

The uplink signals 20 may be content signals or television signals and more specifically digital content or television signals. The uplink antenna 18 communicates the uplink signals 20 to the satellite 12 which in turn generates downlink signals 22. The downlink signals 22 are communicated to a receiving antenna 24 at the user device 26. Although only one user device 26 is illustrated, several user devices may be provided in the system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices 26 may be used such as a cable television set top box. Other types of user devices 26 may include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

An identity provider (IdP) 32C and a second identity provider 32C may be provided within the authentication server 32. The identity provider is used for authenticating the user or request from a user or user device 26. The identity providers authenticate the users so that access may be provided to various types of content such as premium web video content.

The primary service provider 14 may also include a conditional access management system 34. The conditional access management system 34 may be used to grant access based upon certain conditions like subscribing to various programming as well as provide recording commands to the user device 26 as will be described below.

The primary service provider 14 may also include a data web service 36. The data web service 36 may include a programming guide web service 36A, a customer care web service 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide. Content available from an external service provider (80 described below) may also be included in the program guide data. This will be described below.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

A guide search web service 36D may be used to provide searching capabilities to customers of the partner service provider. The searching may take place using stored data within the DIRECTV® listing service 104. The searching as described below may be for linear content, non-linear content or a combination of linear and non-linear content. Both types of content could be made available to customers of the primary service provider to search. Customers of the partner or external service provider and not of the primary service provider may also be provided with access to linear content and potentially non-linear. This may allow potential primary service provider customers to see the wide variety of choices provided by the primary service provider. Non-customers of the provider system may be referred to as a generic user. Generic users may thus be provided with search results from national channels and local channels, if location information is provided.

The primary service provider 14 may also include an authorization server 38. The authorization server 38 may provide authorizations to users and prevent users from having too many simultaneous streams. The authorization server may also be used to prevent access to content that a user has not subscribed to.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may be in communication with an external service provider 80. The primary service provider 14 and external provider 80 may be separate companies that coordinate operations at least to some aspects of their businesses. The external provider may provide content or content schedules to the primary service provider for a limited amount of content. This is particularly suitable for sporting events or the like. The primary service provider 14 may thus provide access to content provided by the external provider to its customers. The customers may or may not be aware of the different source of the material.

The external service provider 80 may include an external data server 82 and an external content server 84. The external data server 82 may provide the program guide web service with program guide data, a product data, graphics data and data about specific actions, celebrities, producers, and the like. Metadata may also be provided by the external service provider 80. The metadata may include various descriptions, network or channel affiliations and the like. One example of an external data that may be provided is the Tribune Media Service® (TMS) identifier. TMS is a commercial service that provides various product content data such as metadata (titles, identifiers, descriptions) and schedules to service providers. Other data providers may be used. The external service provider 80 may provide unique identifiers for each piece of content. The data provided by the external service provider 80 may include movie data, graphics types, TV show data, celebrity data, TV show cards, and other data. Data may also be provided for upcoming movies, shows and other events. The external data provider 80 may include a file transfer protocol server 82 for transferring files in a desired format.

The content server 84 may provide content to the primary service provider 14. The content may be various types of content including promotional content which is relatively short in nature and full-length movies. Other types of content may be provided such as television programming, sports clips and highlights and commercial material. The content server 84 may be in communication with the primary service provider 14 through the network 40. The content server 84 may also be in communication with the user device 26 through the network 40. In one embodiment of the disclosure, the primary service provider may provide data with respect to content that is available to the user device 26. After the user device 26 is authorized, the external service provider may also provide the content directly to the user device 26. The primary service provider 14 may also provide the content from the content server 84 as a pass-through to the user device 26 from the external service provider.

The system 10 may also include a user network device 90 that includes a display 92. The display 92 may be separate or integrated into the user network device 90. The user network device 90 may be a web browsing device such as a portable computer, a personal digital assistant, a portable video player, an automotive-based user device, or the like. For certain aspects of the disclosure, the set top box or user device 26 may be considered a user network device since browsing and obtain content and schedules may be performed therefrom. The user network device 90 may receive various data from the servers within the primary service provider 14. The display 92 may be used for displaying various program guide information, along with other information provided by the partner service provider. The other information may include financial information, weather information, voicemail information, or other types of information. The primary service provider 14 may provide the content to be displayed on a website in various manners together with or in addition to the program guide information or other information.

The primary service provider 14 may also include a television listing server (DLS) database 104. The television listing server database 104 may include data corresponding to various listings for various program times and schedules. The television listing server database 104 may be in communication with the external data provider 80.

A content ingestion system 106 may also be provided within the primary service provider 14. The content ingestion system 106 is used to ingest the partner schedule into the primary service provider data system. The data is used to authorize users of the primary service provider to access the content as well as provide access to the underlying data. The ingestion process will be described below.

The primary service provider 14 may also include an entitlement system 100. The entitlement system 100 may be used to determine the entitlement of the user device 26. That is, the user device 26 may be entitled to or subscribed to various contents and various channels. Authorization from the content available from the external service provider may be limited to content that has been subscribed to. The entitlement system 100 will be further described below.

The primary service provider 14 may also include an IdP discovery service 110. The IdP discovery service 110 is used by the external service provider 80 to identify the preferred identity provider of the user device 26. The relationship between the service provider and the identity provider may be a many-to-many relationship. Thus, the external service provider is required to identify the correct identity provider for the user. As is illustrated in FIG. 1, two identity providers 32C and 32C' are provided within the authentication server 32. However, numerous identity providers may be provided that are in control of the primary service provider 14. The IdP discovery service 110 may be co-located with the primary service provider or located at another location but in communication with the primary service provider 14.

Figure 2:
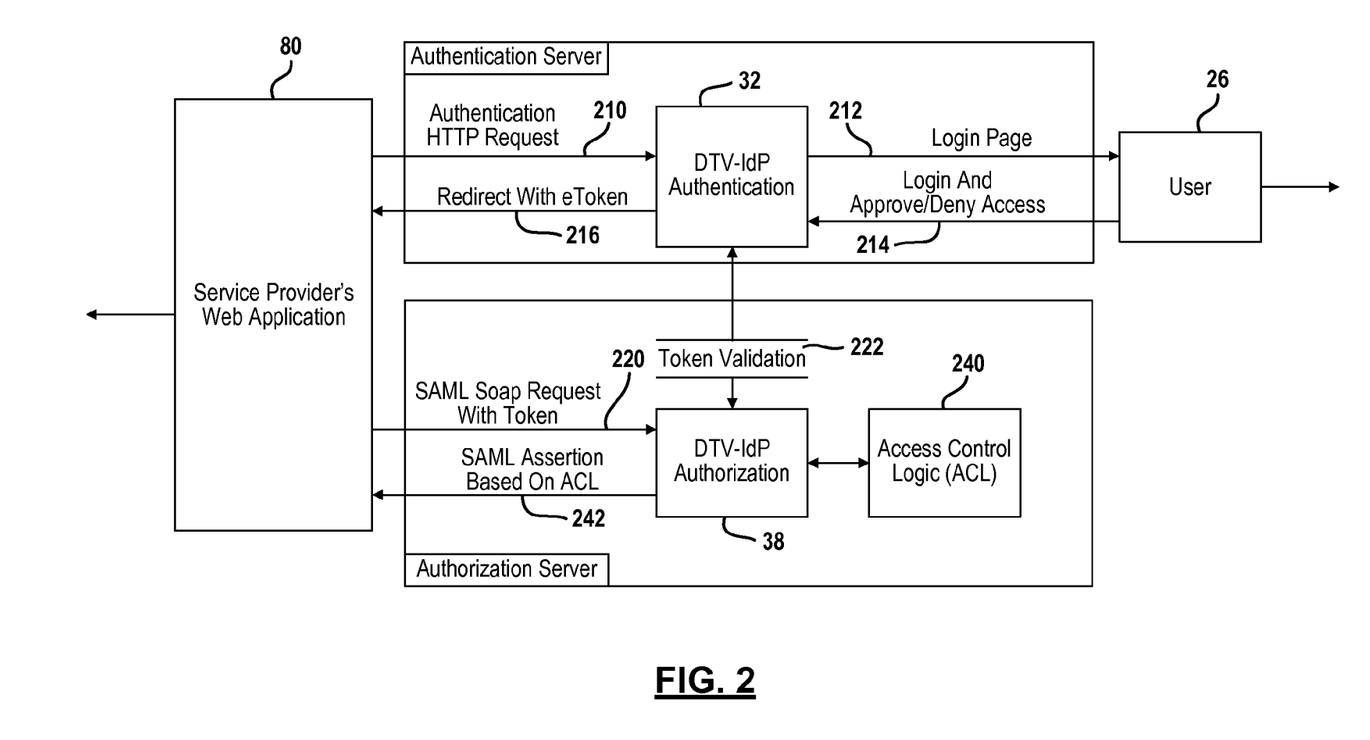
FIG. 2 is a simplified block diagrammatic view of the authentication and authorization system according to the present disclosure.

Referring now to FIG. 2, a simplified block diagrammatic view of the authentication and authorization system is set forth. The authorization and authentication systems may be part of the identity provider illustrated in FIG. 1 or part of the authentication server and authorization server illustrated as reference numerals 32 and 38, respectively.

A service provider website needs to grant access to the content for subscribers to the primary service provider. The primary service provider may provide a login password so that users of the primary service provider may login to the account so that access may be granted to the external service provider content. At a high level, an authentication request 210 is communicated between the service provider web application and the authentication server 32. A login page 212 is provided to the user 226. The user 26 logs in and is approved or denied access in step 214. Once authentication is performed by the authentication server 32, a redirection with an eToken 216 is provided to the service provider's web application so that the user is redirected to access the content.

The authorization portion of FIG. 2 is used to authorize a user. The service provider web application 80 generates an authorization request 220. The authorization request may be a security assertion markup language (SAML) authorization decision query that uses Simple Object Access Protocol (SOAP) over Hypertext Transfer Protocol Secure (HTTPS) binding. The request may include a universally unique identifier (UUID) and a token that is obtained during an initial authentication process as the value of the name identifier element under the subject element. An external identifier such as a Tribune Media Service (TMS) station identifier and program or content identifier may also be included in the request. The authorization service 38 verifies the request. This may also include validating the token through the authentication server 32 as illustrated by reference number 222. The authorization server 38 may verify that a given UUID and token are valid. As will be described further below, access control logic (ACL) 240 may be used to restrict the number of content streams. The authorization server may provide an SAML assertion based upon the ACL to the service provider web application as is illustrated by reference number 242. The authorization assertion permits or denies the user device from accessing the content or opening a new content stream.

Figure 3:
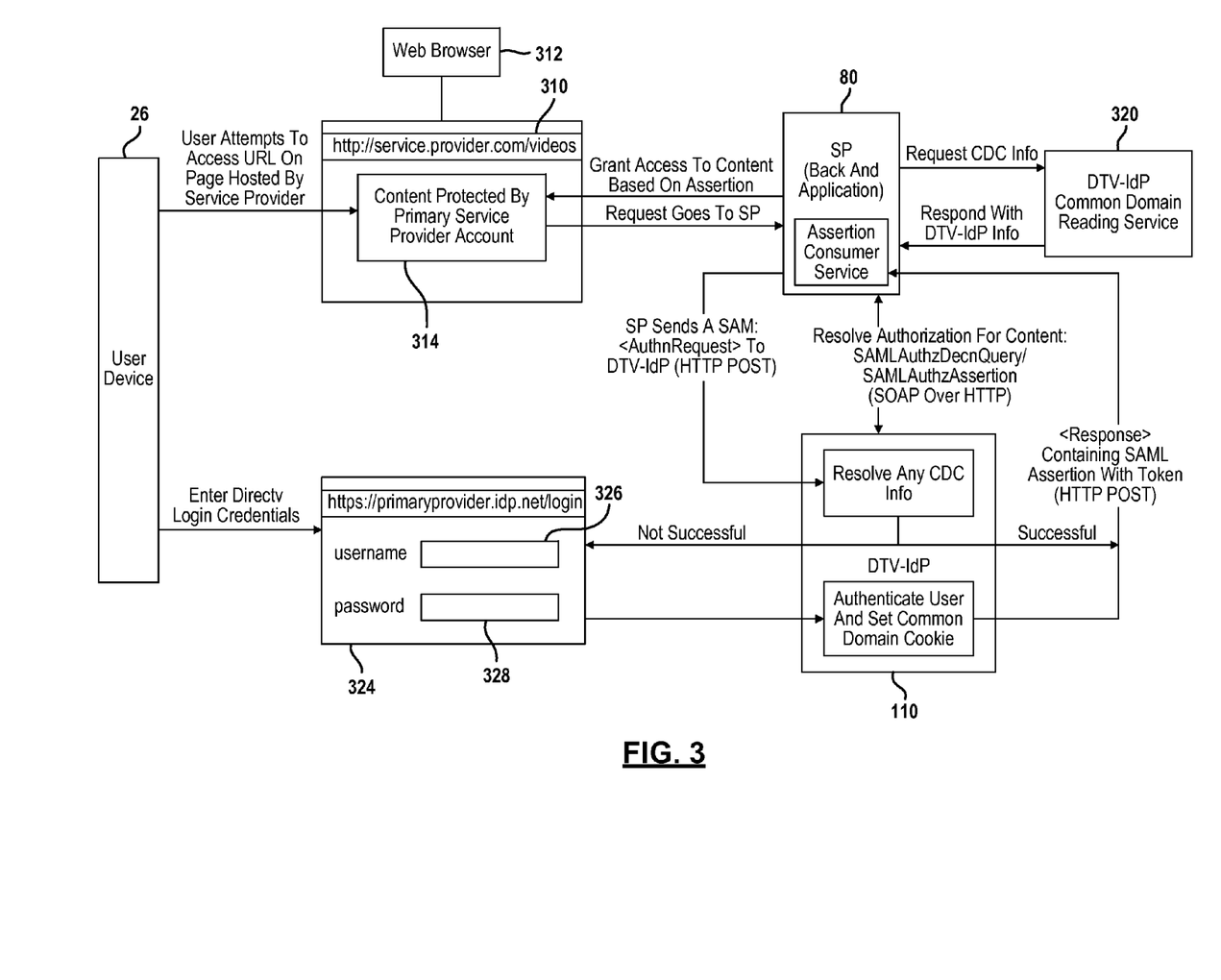
FIG. 3 is a simplified flowchart of the authentication system according to the present disclosure.

Referring now to FIG. 3, a detailed block diagrammatic view of a block diagram illustrating the flow of signals is set forth. The user device 26 attempts to access a universal resource locator on a web page 310 hosted by a service provider. The web page 310 may be associated with a web browser 312. The web page 310 may be able to provide access to content provided by a primary service provider. The content may be protected as illustrated by box 314. A user may be required to be authenticated prior to being able to access the content. The request to access the content is communicated to the service provider through the web page 310. When the request does not have a valid primary service provider token, the request is communicated to a common domain reading service 320 that may be provided by the identity provider. The reading service 320 reads the common domain cookie. The common domain cookie stores a sequence of Service Provider Location Identifiers (e.g. URLs) and tokens in order of that last used by the browser is first in the list from the HTTP request header of the request and checks if the user device has previously logged into the primary service provider. A response may be generated from the common domain reading service 320 to the service provider 80. The common domain reading service 320 responds with an identity provider token that is obtained from the contents of the common domain cookie (CDC).

The service provider 80 may send an authorization request to the authentication server 32. The authentication request may use the SAML protocol.

The identity provider 110 resolves any common domain cookie information within the security context of the identity provider. When the response is not able to be resolved, a login screen 324 is provided so that the login identifier (user name) in box 326 and password in box 328 associated with the user for the primary service provider may be entered. After logging into the primary service provider, the identity provider 110 may authenticate a user and set a common domain cookie.

When the cookie is able to be resolved a token and a DIRECTV® user ID (DUID) or primary service provider user identifier may be provided to the service provider. The DUID is an identifier generated at the authentication server as the external service provider can keep the DUID mapped to an eToken.

Figure 4:
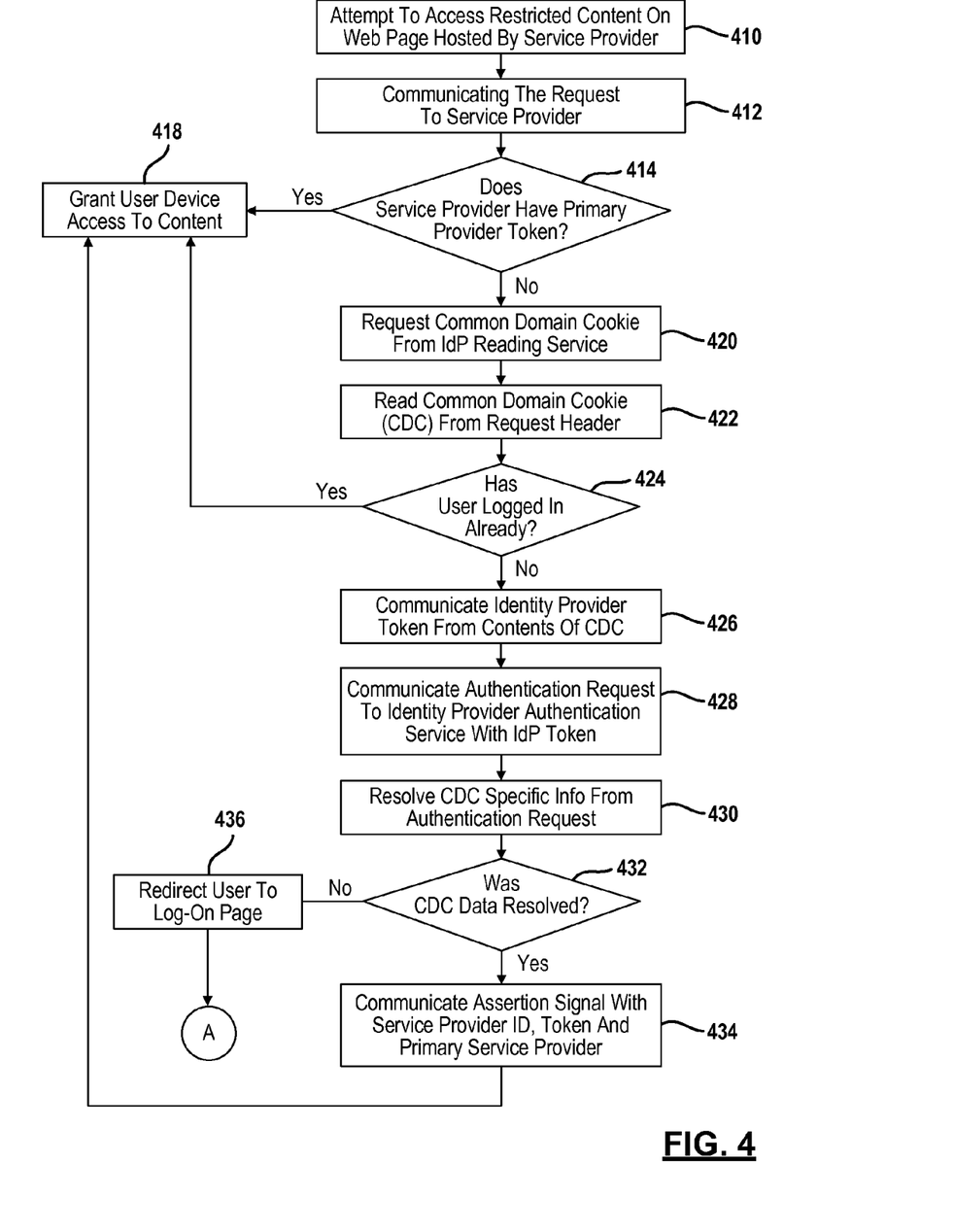
FIG. 4 is a flowchart of a method for authentication according to the present disclosure.

Referring now to FIG. 4, a flowchart of a method for authentication is set forth. Every time a user through a user device tries to access restricted content such as a web video content from a service provider site that is different than the primary service provider, the primary site requires the authentication of the user device. After authentication, authorization may be required for the requested resource. Before accessing the content, the service provider verifies that a user is an authorized user by accessing the identity provider of the primary service provider.

In step 410, the user device attempts to access restricted content hosted by the service provider. In step 412, the request for access is communicated to the service provider. In step 414, it is determined whether the service provider has a primary provider token. If the request includes a primary provider token in step 414, step 416 grants the user device access to the content.

In step 414, when the service provider does not have a primary provider token, step 420 is performed. In step 420, a request is made to the common domain reading service to read the common domain cookie from the request header to check if the user has already logged on. The reading service reads the common domain cookie from the request header in step 422. In step 424, if the user has already logged on, step 416 is again performed. In step 424, if the user has not logged on, an identity provider token is provided from the contents of the common domain cookie in step 426.

In step 428, an authentication request is communicated to the identity provider authentication server with an identity provider token. The authentication request is communicated from the service provider to the identity provider. In step 430, any common domain cookie-specific information is resolved from the authentication request. The last used service provider is being obtained during resolution. The last used provider identity and token may be obtained. In step 432, when the common domain cookie is resolved, step 434 communicates an assertion signal with a service provider identifier, the token and a primary service provider user identification.

Referring back to step 432, when the common domain cookie is not resolved, the user is redirected to a user logon page.

After step 434, the user is granted access to the content in step 416.

Figure 5:
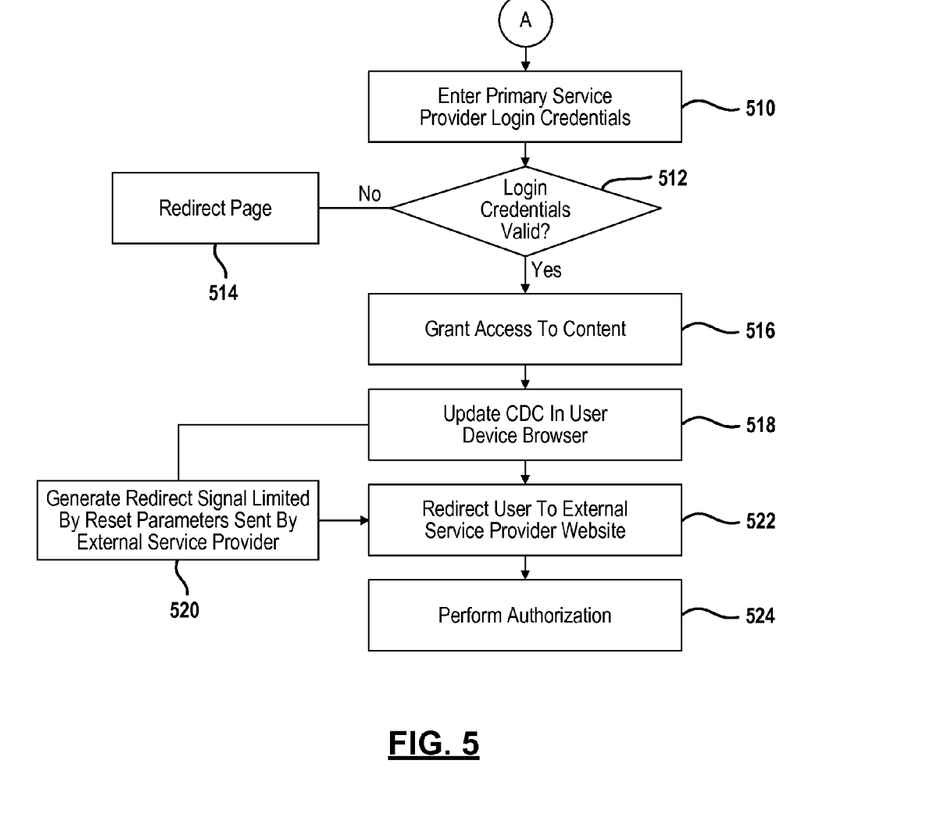
FIG. 5 is a flowchart of a method for entering credentials at a primary service provider.

Referring now to FIG. 5, a continuation of the process of FIG. 4 is provided. In step 510, a primary service provider login credentials are entered by the user at the user device in response to prompts. The login credentials may include a password and primary user provider login identifier. In step 512, if the login credentials are not valid, step 514 redirects the user to a redirection page. In step 512, if the login credentials are valid, step 516 grants access to the content. After step 516, step 518 updates the common domain cookie in the user device browser. The common domain cookie may be updated with the URL of the service provider.

In step 520, the redirect signal may be limited by redirect parameters sent to the external service provider. In step 522, the user is redirected to the external provider website. In step 524, authorization may then take place.

Figure 6:
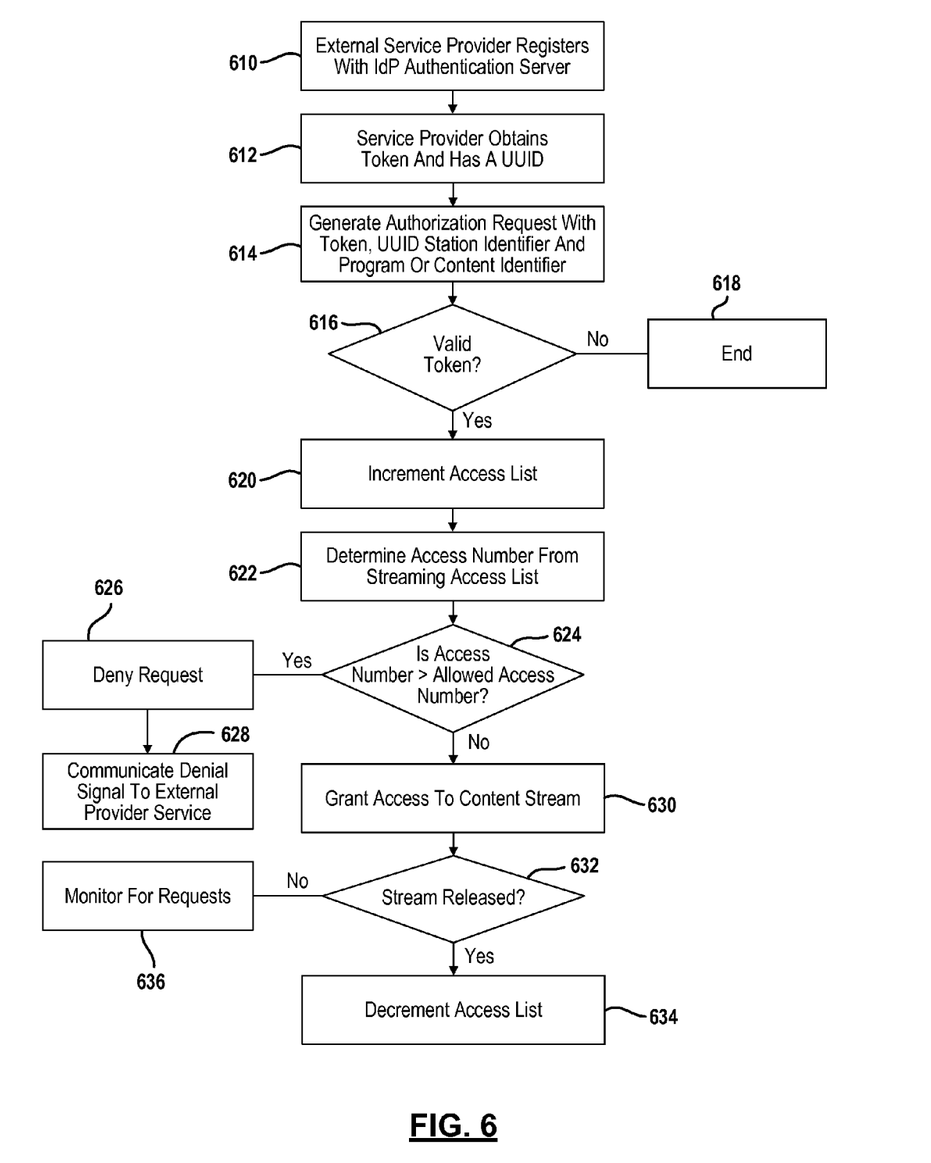
FIG. 6 is a flowchart of a method for authenticating according to the present disclosure.

Referring now to FIG. 6, a method for authorization is set forth. In step 610, the external service provider registers with the identity provider authentication server of the primary service provider. In step 612, the service provider obtains a token and has a universally unique identifier (UUID) assigned thereto. In step 614, an authorization request is generated from the service provider to the authorization server with the token and the UUID. When the token is not valid in step 616, step 618 ends the process.

In step 616, if the token is valid step 620 increments the access list. In step 622, the access number is determined from the streaming access list. The access number corresponds to the number of access streams associated with a user. In step 624, if the access number is greater than the allowed access number, step 626 denies access and communicates a denial signal to the external service provider. In step 624, if the access number is not greater than the allowed access, access is granted to the stream in step 630. In step 632, if a stream is released, the access number in the access list is decremented in step 634. A stream may be released when a user session times out or the user device no longer receives a stream. Access requests and release requests may be continually monitored in step 636 so that an accurate number of streams for each user may be provided. By monitoring the number of streams, the proper number of resources may be allocated to each user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving a request to access content from a user device at an external service provider;
   communicating, at the external service provider, the request to access content to a reading service, said request to access content comprising cookie data that comprises identity provider data;
   requesting, at the external service provider, an identity provider token corresponding to the identity provider data corresponding to an identity provider from the reading service based on the request to access;
   communicating the identity provider token from the reading service to the external service provider;
   generating, at the external service provider, an authentication request having the identity provider token and an external service provider identifier;
   communicating the authentication request and the cookie data from the external service provider to the identity provider;
   when the cookie data is resolved at the identity provider with the authentication request, communicating an assertion signal to the external service provider; and granting access to content to the user device in response to the assertion signal.

2. The method as recited in claim 1 further comprising when the cookie data is not resolved, communicating a login page to the user device.

3. The method as recited in claim 2 further comprising in response to the login page communicating a user identifier and a password corresponding to a primary provider account to the identity provider.

4. The method as recited in claim 3 further comprising updating a cookie in a user browser after communicating the user identifier and the password.

5. The method as recited in claim 4 further comprising redirecting the user device to the external service provider using a redirection signal.

6. The method as recited in claim 4 further comprising redirecting the user device to the external service provider using a redirection signal comprising an authentication token.

7. The method as recited in claim 1 wherein receiving the request to access content comprises receiving the request to access content including a network identifier.

8. The method as recited in claim 1 wherein receiving the request to access content comprises receiving the request to access content including a content identifier.

9. The method as recited in claim 1 wherein the request to access content comprises receiving the request to access content including a network identifier and a content identifier.

10. The method as recited in claim 1 wherein communicating the authentication request comprises communicating the authentication request to the identity provider using Simple object Access Protocol (SOAP).

11. The method as recited in claim 1 wherein communicating the authentication request comprises communicating the authentication request to the identity provider using SOAP over Hypertext Transfer Protocol (HTTP).

12. The method as recited in claim 1 wherein communicating the assertion signal comprises communicating the assertion signal that comprises a service provider identifier and user identifier to the external service provider.

13. The method as recited in claim 1 wherein communicating the assertion signal comprises communicating the assertion signal that comprises a service provider identifier, the identity provider token and user identifier to the external service provider.

14. A system comprising:
an electronic identity provider reading service comprising a first electronic circuit;
an electronic external service provider comprising a second electronic circuit receiving a request to access content from a user device through a network and communicating the request to access content to the identity provider reading service, said request to access content comprising cookie data that comprises identity provider data, said external service provider requesting cookie data corresponding to an identity provider token corresponding to the identity provider data from the identity provider reading service based on the request to access;
said identity provider reading service communicating the identity provider token to the external service provider through the network;
an identity provider comprising a third electronic circuit in communication with the external service provider through a network;
said external service provider generating and communicating an authentication request and cookie data to the identity provider having the identity provider token and a service provider identifier;
said identity provider communicating an assertion signal to the external service provider when the cookie data is resolved at the identity provider with the authentication request; and
said external service provider granting access to content to the user device in response to the assertion signal.

15. The system as recited in claim 14 wherein said identity provider communicates a login page to the user device when the cookie data is not resolved.

16. The system as recited in claim 15 wherein in response to the login page, said user device communicating a user identifier and a password corresponding to a primary provider account to the identity provider.

17. The system as recited in claim 16 wherein a cookie in a user browser in the user device is updated after communicating the user identifier and the password.

18. The system as recited in claim 17 wherein the user device is redirected to the external service provider using a redirection signal.

19. The system as recited in claim 18 wherein the redirection signal comprises an authentication token.

20. The system as recited in claim 14 wherein the request to access content comprises a network identifier.

21. The system as recited in claim 14 wherein the request to access content comprises a content identifier.

22. The system as recited in claim 14 wherein the request to access content comprises a network identifier and a content identifier.

23. The system as recited in claim 14 wherein the authentication request is in a Simple Object Access Protocol (SOAP) format.

24. The system as recited in claim 14 wherein the assertion signal comprises a service provider identifier, the token and a user identifier.

25. The system as recited in claim 14 wherein the assertion signal comprises communicating an assertion signal that comprises the token and a user identifier.

\* \* \* \* \*